(12) United States Patent
Bruecklmayr et al.

(10) Patent No.: US 7,707,631 B2
(45) Date of Patent: Apr. 27, 2010

(54) DEVICE AND METHOD FOR PROCESSING A PROGRAM CODE

(75) Inventors: Franz-Josef Bruecklmayr, Kaufering (DE); Bernhard Lippmann, Bruckberg (DE)

(73) Assignee: Infineon Technologies AG, Neubiberg (DE)

( * ) Notice: Subject to any disclaimer, the term of this patent is extended or adjusted under 35 U.S.C. 154(b) by 1184 days.

(21) Appl. No.: 11/291,097

(22) Filed: Nov. 29, 2005

(65) Prior Publication Data

US 2006/0123403 A1 Jun. 8, 2006

(30) Foreign Application Priority Data

Nov. 29, 2004 (DE) ............. 10 2004 057 490

(51) Int. Cl.
*G06F 12/14* (2006.01)
*G06F 9/45* (2006.01)
(52) U.S. Cl. .................... 726/21; 713/164; 717/139
(58) Field of Classification Search ............. 726/21
See application file for complete search history.

(56) References Cited

U.S. PATENT DOCUMENTS

2002/0138748 A1* 9/2002 Hung ............. 713/190
2006/0005262 A1* 1/2006 Kudelski et al. ....... 726/27

OTHER PUBLICATIONS

Saputra et al., "Code Protection for Resource-Constrained Embedded Devices", Jun. 11, 2004, ACM, pp. 240-248.*
Clarke, S. J., Safety Considerations in Using IEC 1131-3 Programming Languages, May 15, 1998, IEEE, pp. 1-6.*
Chris Hawblitzel, et al.; "SLK: A Capability System Based on Safe Language Technology"; Department of Computer Science, Cornell University, Internal Memo, Mar. 1997.

* cited by examiner

*Primary Examiner*—Matthew B Smithers
(74) *Attorney, Agent, or Firm*—Dickstein, Shapiro, LLP.

(57) ABSTRACT

A device for processing a program code with a plurality of subprogram calls, a subprogram corresponding to a subprogram call taking place by means of an allocation table, has a security module having the allocation table and a processor for using the program code. Access to the allocation table in the security module is restricted. The processor for using the program code is formed to retrieve, responsive to a request for subprogram data, using authorization information, subprogram data via the allocation table in the security module.

17 Claims, 10 Drawing Sheets

DEVICE AND METHOD FOR PROCESSING A PROGRAM CODE

CROSS-REFERENCE TO RELATED APPLICATION

This application claims priority from German Patent Application No. 102004057490.1, which was filed on Nov. 29, 2004, and is incorporated herein by reference in its entirety.

BACKGROUND OF THE INVENTION

1. Field of the Invention

The present invention relates to a device and a method for processing a program code as may particularly be used for processing program code of object-oriented programming languages.

2. Description of Related Art

Software programs require structuring of the source code. Structuring of this kind is supported by object-oriented programming languages by class definitions. It is achieved by means of classes that a program code may be re-used and that a program is structured such that diagnosis and service are made easier considerably. In object-oriented programming, the class is an abstract generic term for the description of a common structure and a common behavior of objects. The structure of a class is defined via attributes and the behavior is defined via methods, also called operation, function and procedure. Objects generated from classes are referred to as examples or instances of the class. In some programming languages, there is a certain object for each class serving to represent the class at run time and being responsible for generating objects of the class and calling correct methods.

When compiling a source text, in some programming languages or environments, it is not a machine code which is established directly, but an intermediate product, the so-called byte code or intermediate language code. This intermediate code is usually machine-independent and relatively compact compared to the source text and to the machine code. Java is one of today's best-known examples of a byte code-based programming language. Other languages employing byte codes are, for example, C# or Delphi.NET.

A so-called virtual machine, in the case of Java, Java VM, executes the intermediate code. Executing the intermediate code by the virtual machine is time-intense. Special just-in-time compilers (JIT compilers) translate byte code bits into corresponding machine code pieces once during program execution and then execute same. In this way, the execution times, but not the starting times may often be forced into the region of pre-translated machine codes.

Figure 7:
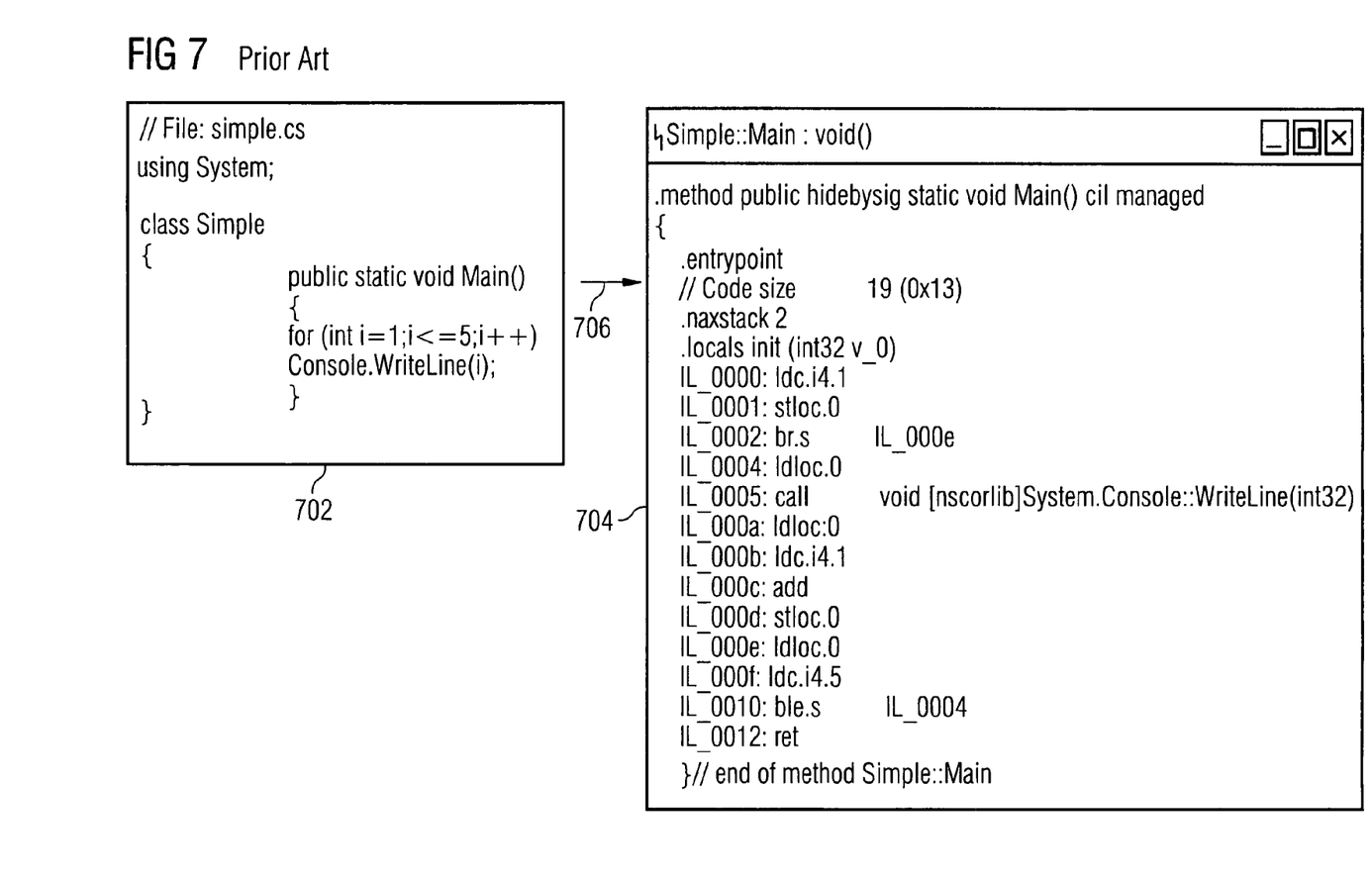
FIG. 7 shows a comparison of a source code and an intermediate code according to the prior art.

FIG. 7 shows a comparison of a source code program 702 and an intermediate code program 704 generated from it. The intermediate code 704, which is also referred to as byte code or intermediate language, is generated from the source code 702 by a compiling process 706.

In the source code 702, an FOR-loop is passed and a count is output with every pass. A subprogram or a method Write-Line is called for outputting the count.

This stack-oriented intermediate code 704 does not yet consist of machine instructions. The structure of the source code 702 from which the intermediate code 704 has been generated may still be recognized. In particular, the subprogram call WriteLine and the FOR-loop realized by a return may be recognized.

In object-oriented programming language, methods or procedures are frequently called, wherein it is not possible to determine the procedure called without considering the object reference associated to the method call. For managing the methods in object-oriented programming languages, tables calling an association between class-specific methods and comprising the pertaining procedures are thus generated. When so-called virtual methods are called, the compiler does not store the address of the method in a program code, but manages these methods in a separate table, the so-called virtual method table (VMT). Only the address of the virtual method table is stored in the pertaining object. The compiler causes an extra VMT to be formed in the memory for each class when executing the program. All the virtual methods of this class are entered in this table, together with their addresses. Instead of calling virtual methods, the compiler generates intermediate program code looking in the VMT which method is really to be called for the respective object. Thus, not the data type of the reference (class) but the data type of the object is used for identifying the VMT. Calling the method via the VMT will consequently always result in the correct method. This calling is also referred to as late binding because the program to be executed determines the address of the method at run time.

Figure 8:
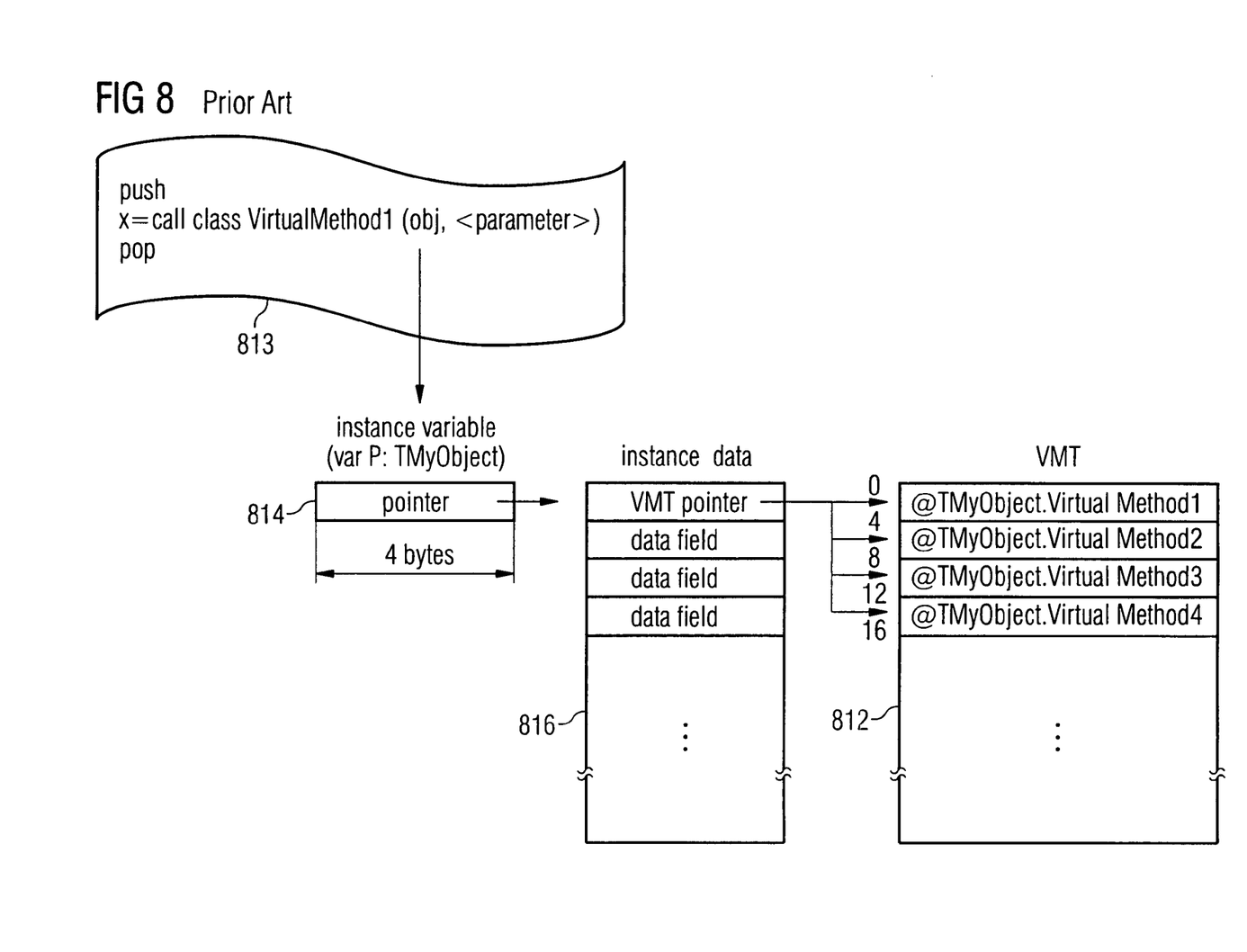
FIG. 8 shows a structure of a prior art virtual method table.

FIG. 8 shows the structure of a virtual method table and its relationship to the object instance. The virtual method table 812 is a read-only look up table comprising a field of pointers and being generated for each class of a source program when compiling the source code and being stored in the instruction space of the programmer.

The virtual method table 812 comprises four methods associated to a class. The methods are methods VirtualMethod 1 to 4. The method call in the source program 813 is illustrated in the intermediate code as a pointer 814 pointing to the object 816 from which the method has been called. The source program 813 comprises a method call for the method VirtualMethod 1. The term VirtualMethod 1 may be an index or offset serving to determine the actual location of the subprogram address. The object 816 comprises a VMT pointer pointing to the virtual method table 812. The virtual method table 812 thus allows selecting the correct method when calling a method. This is important because there may be different methods for different classes, or which, however, have been given the same method name. Consequently, it is not possible without the virtual method table 812 to associate the correct method to a method call.

A dynamic method table DMT is generated for each class declaring new dynamic methods or inherited dynamic methods. The dynamic method table is much smaller than the virtual method table and only stores special information on dynamic methods of a class.

Figure 9:
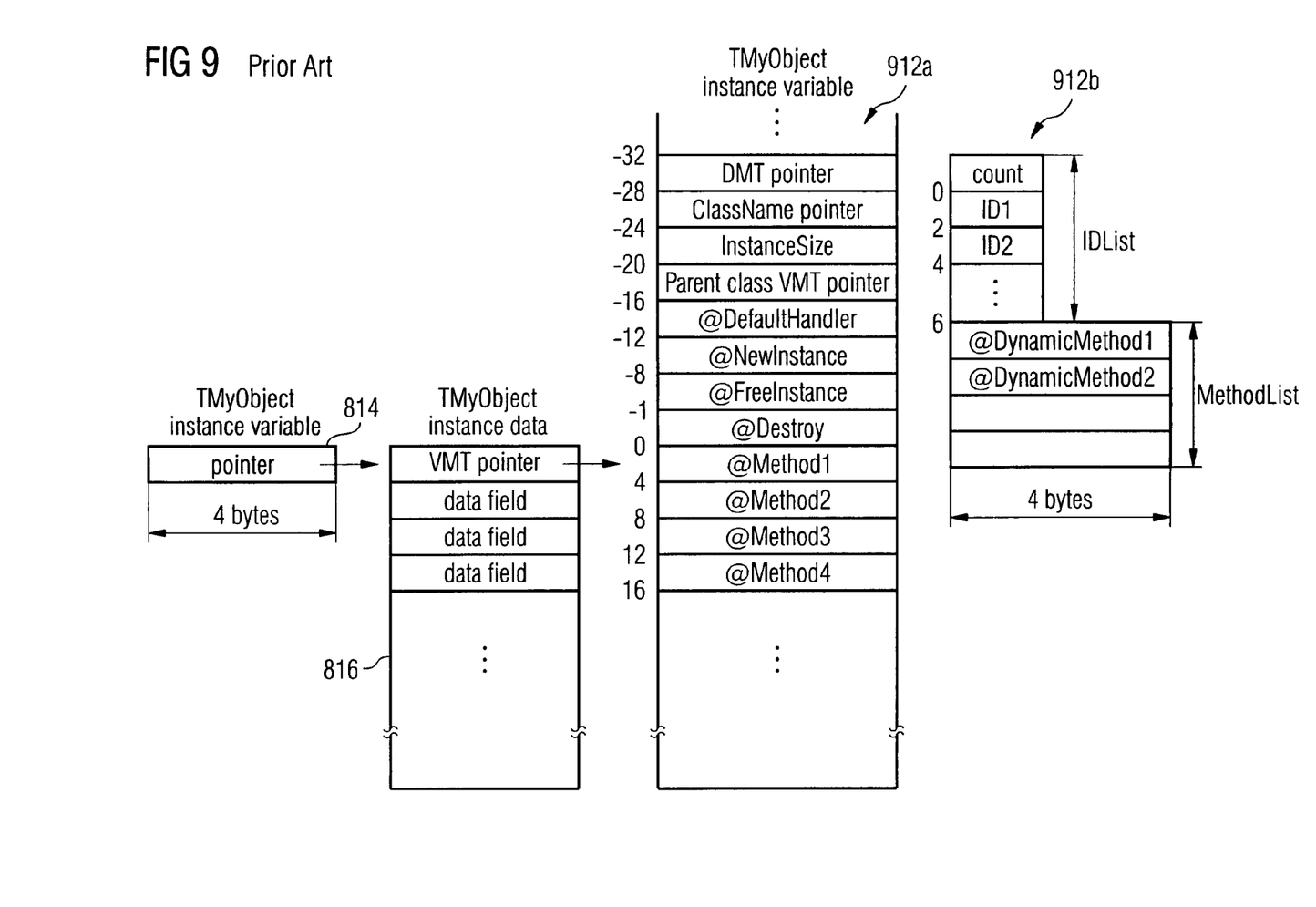
FIG. 9 shows a structure of a prior art dynamic method table.

FIG. 9 shows the structure of a dynamic method table DMT 912b and its relationship to the object instance 816 and the virtual method table 912a.

Figure 10:
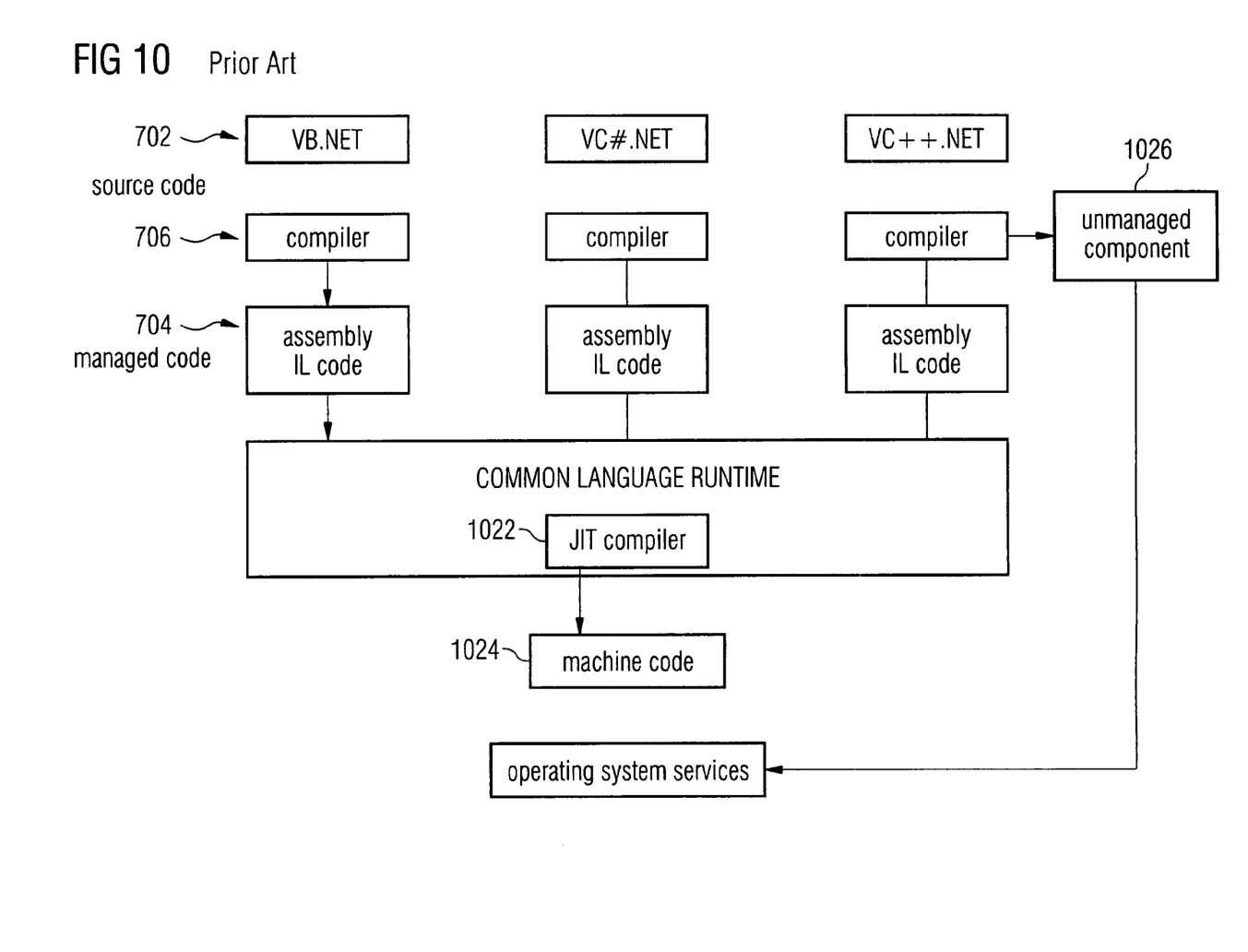
FIG. 10 is a detailed illustration of the NET technology.

FIG. 10 shows the .NET technology by the software producer Microsoft in detail. .NET is a set of software technologies consisting of, apart from a virtual run time environment, a frame work of class libraries and services serving as the basis for self-developments. The so-called Common-Language Specification defines a common subset of binary code, which may be translated from the virtual run time environment into the machine code of a destination machine and then be executed by the destination machine. Thus, it is possible to program NET by different languages. Visual Basic.NET, Visual C#.NET or Visual C++.NET are, for example, available as languages. A source program 702 established in these languages is converted to an intermediate code 704, the so-called binary code, according to the Common Language Specification by a compiler 706. It is tried by means of different techniques to keep the negative impact of the run time of a program on the program speed as small as possible. Available for this is a just-in-time compiler JIT 1022 translating the binary code 704 into a machine-executable machine code 1024. The just-in-time compiler offers a middle course between interpreting and compiling the binary code 704. In addition, further programming languages may be employed where the compiler directly generates the machine code 1026. This machine code 1026 will then be executed on the operating system bypassing the intermediate step via the binary code 704.

As can be seen from FIG. 7, the source code and, in particular, the object structures in the code represent the intellectual property and the economic value of a software program. Performance and code effectivity are directly dependent on the optimum definitions of classes and objects. The intermediate code will always contain the data and object structures of the source code. Object-oriented high-level languages distributed in the form of intermediate code, such as, for example, Java, C#, Delphi.NET, thus offer less protection against disassembly than a 100% compiling language.

In contrast to the prior art Windows environment where a user obtained an executable machine code as an *.exe file, an intermediate code is given to the user in the novel NET environment. In the machine code of the *.exe file, the so-called native code, a connection to the high-level language data structure has been dissolved as far as possible. Consequently, there is no direct relation between the machine code and source code objects, data structures and methods.

Thus, in the prior art Windows environment, the intellectual property of the software developer has been protected by the compiling process because the user of the *.exe file could not become aware of internal program structures.

In the novel .NET environment, the intellectual property of the software developer is no longer protected by a compiling process because the binary code 704 is provided to the customer in the .NET environment instead of the machine code.

When providing intermediate code, a software producer is at risk of a user of the intermediate code to do reengineering and thus to be able to produce the software used by himself or imitate and distribute data structures.

In large programs, re-naming of subprogram calls already offers protection against reconstructing the original source code. With lower security requirements, this may already be considered as sufficient protection of the source code.

SUMMARY OF THE INVENTION

It is an object of the present invention to provide a device and a method for processing a program code allowing protection of the intellectual property contained in the program code.

In accordance with a first aspect, the present invention provides a device for processing a program code with a plurality of subprogram calls, a selection of a subprogram corresponding to a subprogram call taking place by means of an allocation table, having: a security module having the allocation table, wherein access to the allocation table in the security module is restricted; means for using the program code, wherein the means for using is formed to provide a subprogram request to the security module responsive to a request for subprogram data, and is also formed to retrieve, using authorization information, the subprogram data via the allocation table in the security module to reply to the request in this way.

In accordance with a second aspect, the present invention provides a method for processing a program code with a plurality of subprogram calls, a selection of a subprogram corresponding to a subprogram call taking place by means of an allocation table, having the steps of: providing the program code; providing the allocation table in a security module, access to the allocation table in the security module being restricted; and using the program code and, responsive to a request for subprogram data, providing a subprogram request to the security module and retrieving subprogram data using authorization information.

In accordance with a third aspect, the present invention provides a computer program having a program code for performing the above-mentioned method when the computer program runs on a computer.

BRIEF DESCRIPTION OF THE DRAWINGS

Preferred embodiments of the present invention will be detailed subsequently referring to the appended drawings, in which.

DESCRIPTION OF PREFERRED EMBODIMENTS

The present invention is based on the finding that a reconstruction of an original source program code or the data or object structures used will only be possible in a sensitive way if the association rule between subprogram calls and subprograms is known. If the association between subprogram calls and subprograms is broken, the intellectual property of a program code will be protected because the algorithmic, data modelling or the object association in a program code cannot be concluded.

Subsequently, a source text will also be referred to as source code or source program code. A source text is, for example, a program written in C or Java. Expressions like byte code, intermediate language code, binary code and program code fall under the term intermediate code. Intermediate program code is code for internal processes, such as, for example, for determining a procedure to be called. Machine code is the code which may be executed directly by the destination platform.

According to the inventive approach, access to an allocation table comprising the association rule between subprogram calls and subprograms is restricted by storing the allocation table in a container restricting access to the allocation table. The container may thus be formed in either software or hardware.

In contrast to the prior art, the allocation table, being an important part of the compiling process of a program code, according to the present invention is no longer embedded directly in the source code, but transferred to a security module. Thus, direct access to the allocation table is prevented. Accesses to the allocation table, however, must take place via the security module.

An advantage of the present invention is that the intellectual property of a software developer may also be protected in object-oriented high-level languages distributed in the form of intermediate codes, because the inventive approach offers protection from disassembly. The inventive approach can thus be employed both in existing object-oriented high-level languages and in MS.NET technology.

In addition, no additional expenses are required for extending the security of the intellectual property. Class reconstruction by means of analyzing the machine code is not possible because no unique correlation between a class definition and a subprogram may be recognized.

According to one embodiment, the allocation table is located in a security processor or in a security element. The security processor may be a trusted platform module TPM or a Smartcard. In this case, a chip card is, for example, delivered to a user together with the program code, the chip card containing the allocation table. The program code may only be executed in connection with the chip card, since the allocation table comprises the association between a subprogram call and the respective subprogram. Accessing data of the allocation table in the chip card by the user of the program code, for example, is not possible. In this way, it is not possible for the user to reconstruct the original complete program code.

According to another embodiment, the means for using the program code is formed to provide the authorization information in the form of a request sequence. The security module is also formed to evaluate the request sequence and to provide, depending on the evaluation, the subprogram data corresponding to the subprogram call. A request sequence may be a history containing requests of the past to determine therefrom which elements may be requested in future.

According to one embodiment, security compiling is performed. Here, an exe file is generated together with the security module. The allocation table here must not be transported directly to the destination platform.

A hardware-based solution of the security module offers high protection against disassembly of the program code. Devices requiring an additional security module, such as, for example, in the form of a chip card, are required for many applications. In this case, locating the allocation table in his security module already present does not entail additional expenses.

Alternatively, the security module may be formed in software. In this case, the data of the allocation table may be encrypted such that a user having been delivered the program code comprising the encrypted allocation table is not able to decrypt the encrypted data of the allocation table and thus cannot find out about the algorithms, methods and object structures contained in the program code. Forming the security module in software is very cost-effective because no additional hardware is required and distributing the program code together with the allocation table is possible easily, such as, for example, via the Internet.

The inventive approach offers a software developer the possibility of deciding whether they desire high protection of their intellectual property and thus fall back on a hardware-based design of the security module, or whether a cheaper easier-to-handle software solution is sufficient. The expenses for reengineering a program code delivered may also be taken into consideration for this decision.

The inventive approach is particularly suitable for programs having simple program structures, such as, for example, in applications for mobile terminals, such as, for example, mobile phones, where reengineering is easily possible due to the simple program structures. If the expenses for reengineering are already high due to a complex program structure, or if only limited protection is required, a software solution of the security module will be appropriate. If, however, higher protection is required, a hardware-based solution is appropriate.

According to the inventive approach, the protection of the intellectual property of a software developer is by modified compiling technology. Here, the data of the allocation table is stored in the security module during the compiling process of a source code. This may, for example, take place by employing another security compiler. Here, the actual compiler will be stopped as soon as program structures to be protected are to be compiled, and the security compiler is called compiling this part of the program code and extracting the data of the allocation table such that it may immediately or later be stored in the security module. In this case, a modified compiler will be required.

In order to continue using compiler technologies already present, an additional pre-compiler may be employed. This pre-compiler is responsible for modifying subprogram calls present in a source code to be compiled and forming the allocation table so that the pre-compiled source code may subsequently be compiled by a conventional compiler to form the intermediate code.

Using a pre-compiler is also of advantage in that names of subprogram calls used in the source code may be changed. Typically, nomenclature indicating the pertaining subprograms is used in the source code. If names of this kind are replaced by arbitrary names, this will already offer first protection against the reconstruction of the original program code.

According to another embodiment of the present invention, the device comprises a post-processor replacing names and loading tables to a load file for a security module transfer. The post-processor may be used after compiling.

According to an embodiment of the present invention, the means for using the program code is a compiler forming an executable machine code from an intermediate code. According to another embodiment, the means for using the program code is an interpreter or a virtual machine formed to compile and directly execute the intermediate code in the form of the program code.

In the subsequent description of preferred embodiments of the present invention, same or similar reference numerals will be used for elements illustrated in different drawings and having similar effects, a repeated description of these elements being omitted.

Figure 1:
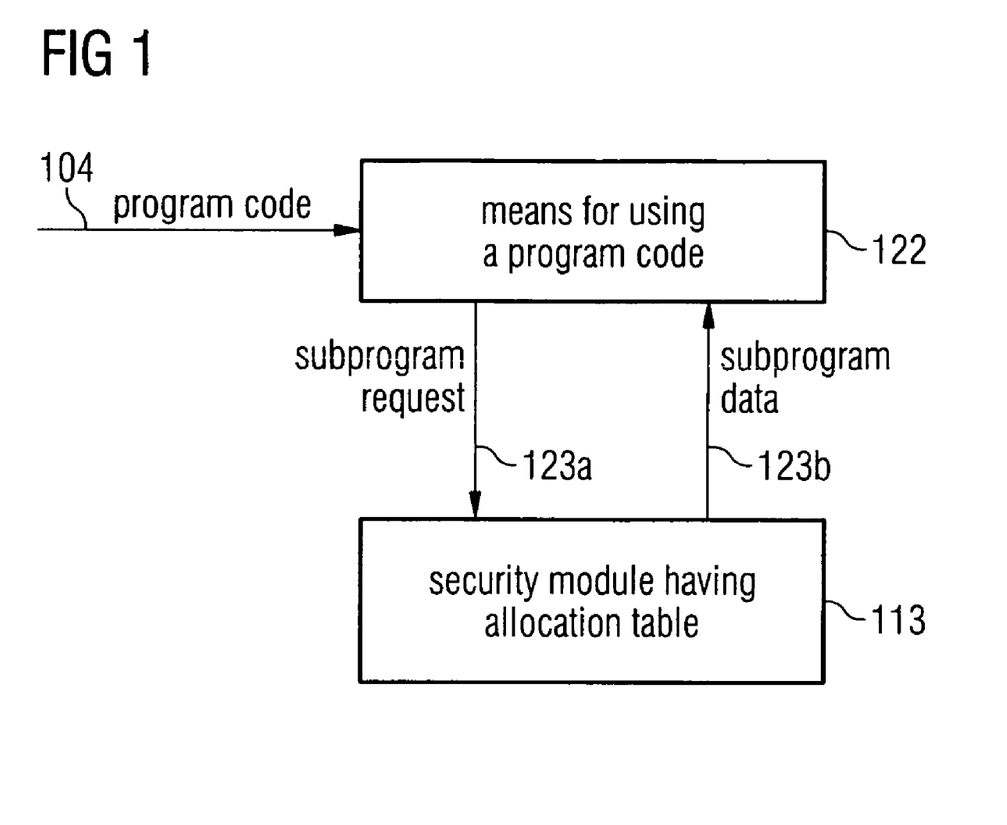
FIG. 1 shows a block circuit diagram of a device for processing a program code according to an embodiment of the present invention.

FIG. 1 shows a block circuit diagram of a device for processing a program code according to an embodiment of the present invention. The device for processing a program code is formed to receive a program code 104. The device for processing comprises a security module 113 having an allocation table, the allocation table allowing an association between subprogram calls contained in the program code 104 and the pertaining subprograms. The program code 104 is processed in means 122 for using a program code. The means 122 for using a program code is formed to provide, responsive to a subprogram call in the program code 104, a subprogram request 123a to the security module 113 having the allocation table and to retrieve subprogram data 123b from the allocation table to be able to associate the corresponding subprogram to the subprogram call in the program code 104. This subprogram may be contained in the program code 104 or be stored in additional libraries. Alternatively, the subprogram data 123b may contain the subprogram.

The security module 113 is a container containing the allocation table and may be formed in either hardware or software. Access to the allocation table in the security module 113 is restricted to prevent data of the allocation table to be read out by attackers trying to retrieve the source code from the program code 104. In order to retrieve the subprogram data 123b from the security module, the means 122 for using a program code is provided with authorization information. The authorization information may serve to obtain access to the security module 113 or to decrypt the data of the allocation table stored in the security module 113.

The authorization information may, by example, be a key provided by the means 122 for using a program code together with the subprogram request 123a to the security module 113. The security module 113 may be formed to check the key received and, depending on the check, to provide the subprogram data 123b requested or to refuse access to the allocation table if the key is wrong.

If the data of the allocation table in the security module 113 is stored in an encrypted form, the authorization information may be a decrypting value allowing the means 122 for using a program to decrypt the subprogram data 123b received and encrypted. If the data of the allocation table are present in an encrypted form, the security module 113 may be simple memory means for storing the encrypted allocation data.

The authorization information is defined during or after providing the program code and the allocation table by the software developer or the distributor of the program code and determined in the program code and the security model or the allocation table such that the means for using is allowed to retrieve the data of the allocation table when executing the program code, wherein any other accesses to the data in the allocation table, however, are prevented.

According to an embodiment, the device for processing a program code is formed to process a program code 104 in the form of an intermediate code or byte code. The intermediate code is generated from a source code by a compiling process. In the compiling process, the allocation table is generated apart from the program code 104. The means 122 for using the program code 104 may be another compiler converting the intermediate code 104 to a machine-readable code. The means 122 for using a program code may also be an interpreter or a virtual machine formed to interpret and execute the intermediate code 104.

If the program code 104 is a program code of an object-oriented language, the allocation table may be a virtual method table or a dynamic method table DMT. The subprogram calls may in this case be method calls. Also, all kinds of procedure calls or function calls where a program jump to the memory location of the subprogram is required for executing the subprogram, fall under the term subprogram calls.

Figure 2:
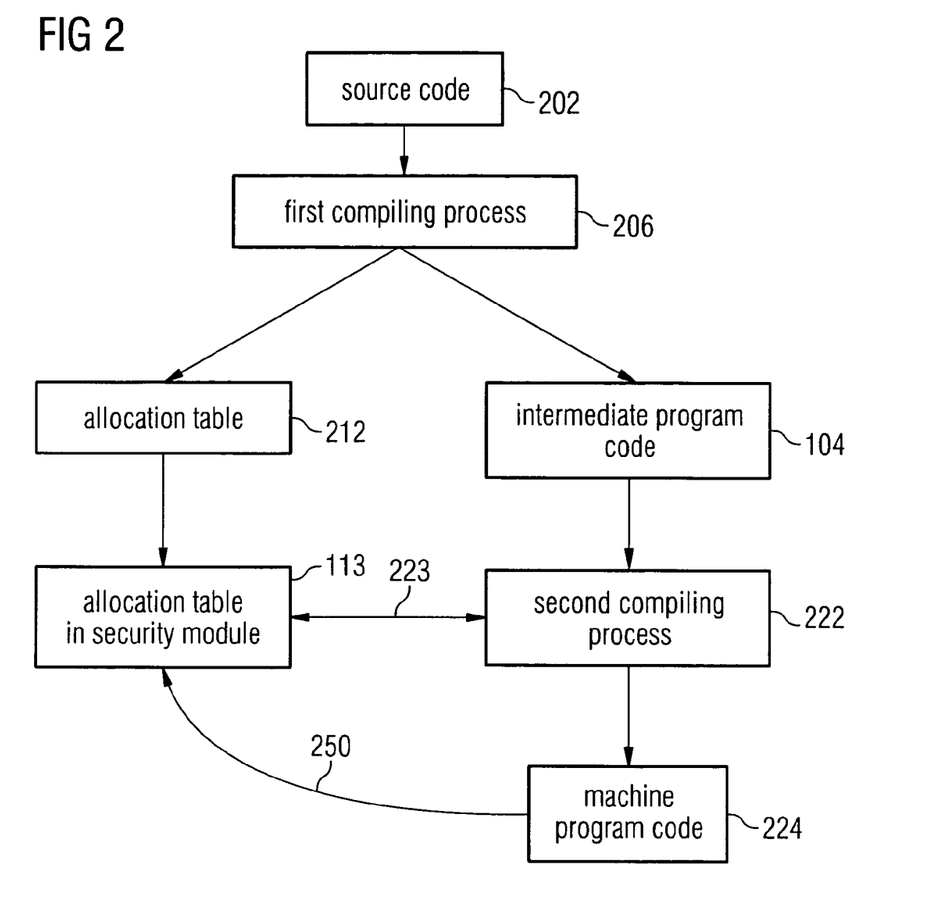
FIG. 2 shows a flow chart of a method for processing a program code according to another embodiment of the present invention.

FIG. 2 shows a flow chart for forming a machine program code from a source code using the inventive approach. The source code 202 in this embodiment is a high-level language program. The program code 104, in this case an intermediate program code, and data of the allocation table 212 are generated from the source code 202 by a first compiling process 206. The allocation table 212 is arranged in the security module 113. A second compiling process 222 where a machine program code 224 is generated from the intermediate program code 104 using 223 the data of the allocation table 212 in the security module 113 takes place in means for using a program code (not shown in FIG. 2). The second compiling process may be an interpretation. Thus, run time information is also considered, for example when using virtual methods.

According to this embodiment, a separation of class information "class info" from the code takes place when generating the code, that is when forming the intermediate code from the source code. The intermediate code is generated by means of a compiler. When forming the machine code from the intermediate code during run time or load time, security module inquiries are inserted. Forming the machine code takes place by means of an interpreter/JIT. In the run time execution of the machine code, a security model inquiry 250 occurs in a method call.

According to another embodiment, the means for using the program code is formed to execute machine code and to provide code for forming and evaluating subprogram requests.

Locating the allocation table 212 in the security module 113 and/or encrypting the data of the allocation table 212 may already take place automatically during the first compiling process 206. Alternatively, the allocation table 212 may only be encrypted subsequently or arranged in the security module 113 subsequently. The first compiling process 206 is performed at the software developer or the distributor of the intermediate program code 104.

If the allocation table is provided in an encrypted form, the encrypted allocation table may be part of the program code 104 or alternatively be delivered as a second program to the user. Alternatively, the allocation table may first be located at the user of the program code 104 in the security module 113. In this case, the data of the allocation table may be delivered in a protected self-extracting second program formed to store, when being installed, the data of the allocation table in the security module in order for the user of the program code 104 not to have access to the allocation table.

Figure 3:
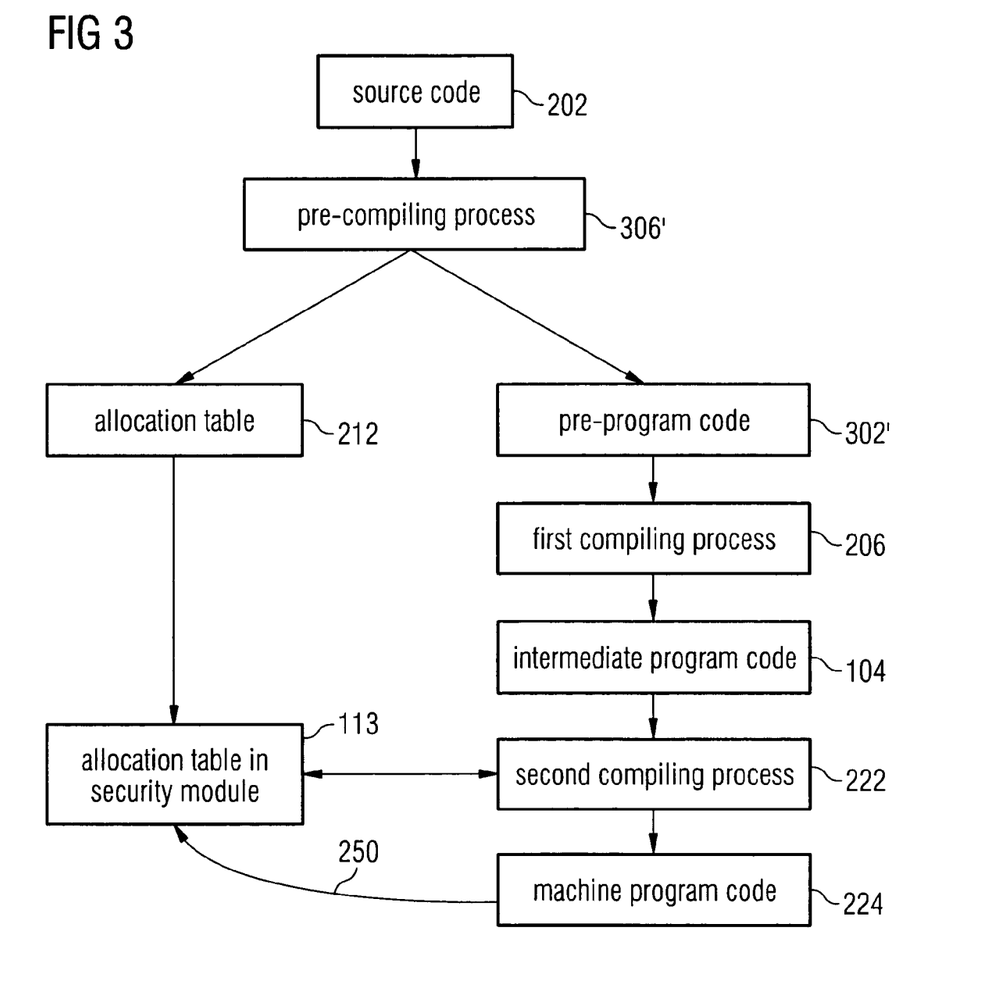
FIG. 3 shows another flow chart of a method for processing a program code according to another embodiment of the present invention.

FIG. 3 shows a flow chart of another embodiment for forming the machine program code 224 from the source code 202.

According to this embodiment, the intermediate program code 104 is not generated directly from the source code 202 but a pre-program code 302' is at first generated from the source code 202. For this, the source code 202 is compiled in a pre-compiling process 306'. Both the pre-program code 302' and the allocation table 212 are generated in the pre-compiling process 306'. The intermediate program code 104 is generated from the pre-program code 302' by the first compiling process 206.

During the pre-compiling process 306', subprogram calls of the source code 202 may be re-named in order for subprogram calls in the pre-program code 302' not to include name references to the subprograms to be called.

Figure 4:
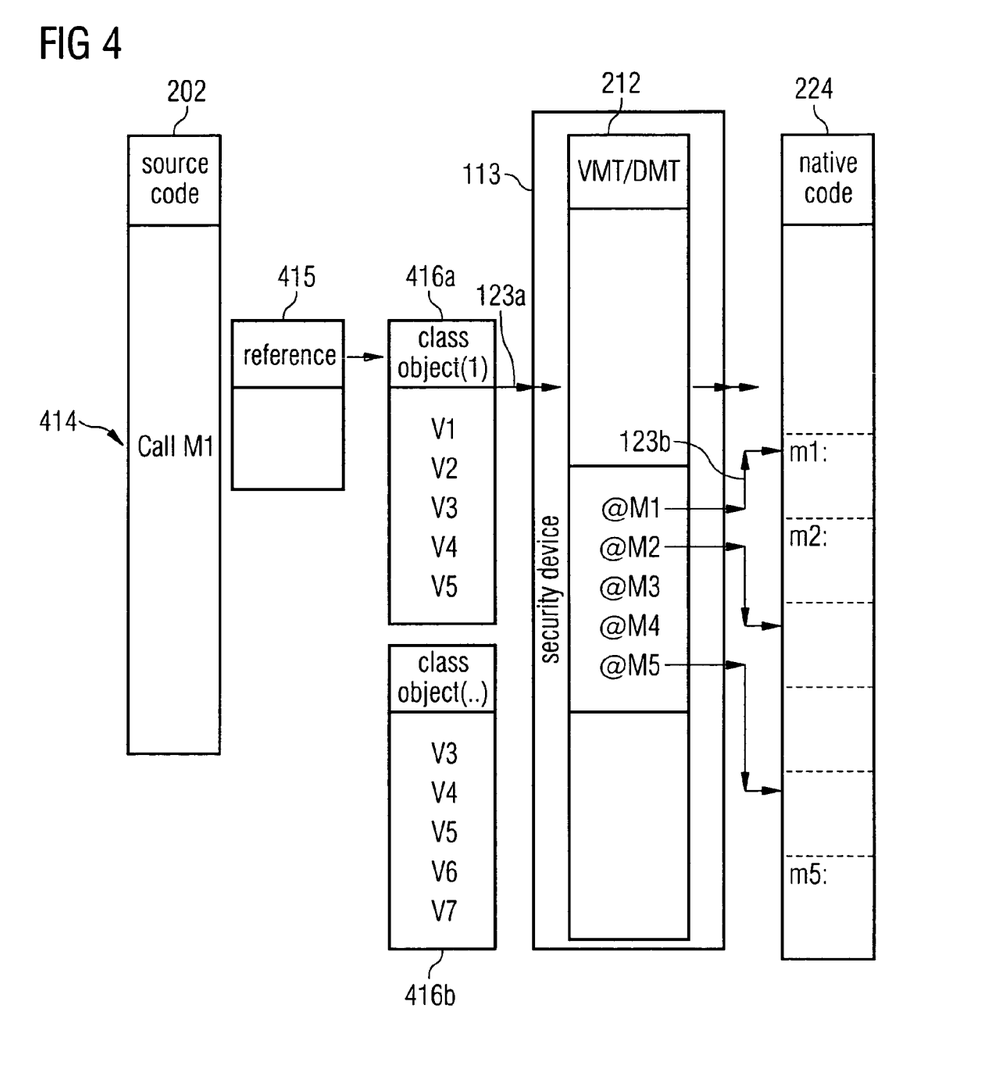
FIG. 4 shows a schematic illustration of the generation of a machine code from a source code according to an embodiment of the present invention.

FIG. 4 shows an arrangement of the allocation table 212 in the form of a virtual method table or a dynamic method table within a security module, such as, for example, a security element like a TPM or a chip card. The allocation table 212 is stored in the security element 113. A method call 414 "Call M1" in the source code 202 comprises a reference 415 being a parameter of the call. The reference 415 is given to the call and includes a pointer to the pertaining object class definition 416a, b of the method call 414. The method call 414 in the source code results, in the intermediate code, in the subprogram request 123a made to the allocation table 212. Responsive to the subprogram request 123a, the security module 113 provides sub-program data 123b.

The subprogram data 123*b* is a pointer to the subprogram m1 corresponding to the subprogram call 414 M1.

According to this embodiment, the class structures are re-defined using a unique method pointer m(i). This method pointer m(i) allows loading the pertaining method to an unsafe platform not protected against reverse engineering, via the protected allocation table in the form of the VMT or DMT. In this context, the device for processing a program code may be considered as a "protected byte code compiler".

Figure 5:
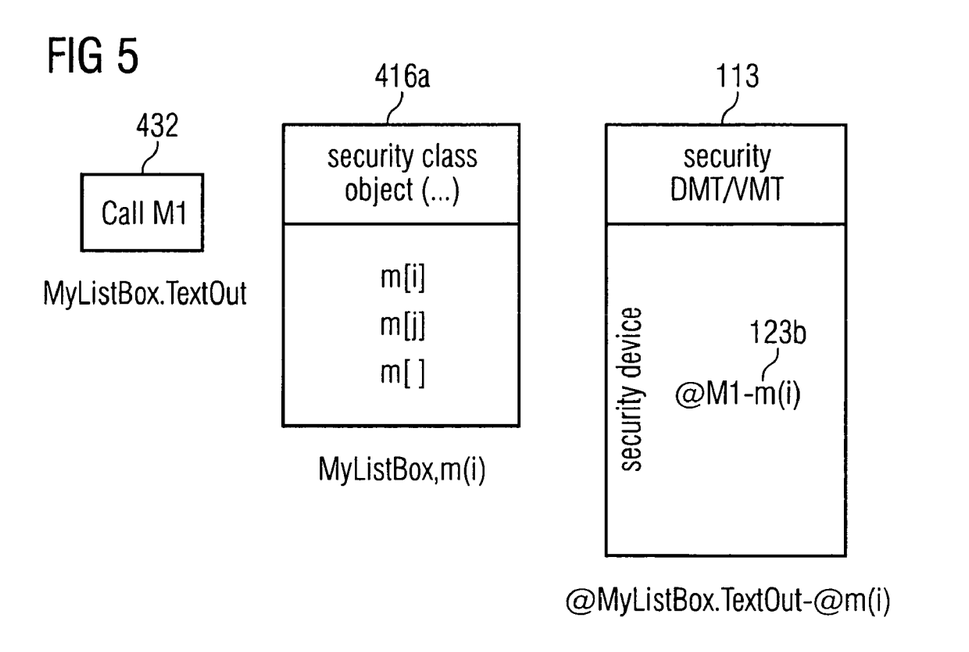
FIG. 5 shows a schematic illustration of the connections between a subprogram call and allocation data in a security module according to the present invention.

FIG. 5 illustrates the connection between a subprogram call 432 and the allocation table data arranged in the security module 113 according to an embodiment of the present invention.

The method TextOut associated to the object MyListBox is called in the subprogram call 432. The name of the method TextOut has been renamed to M1 in the intermediate program. This re-naming may take place in a pre-compiling process. The allocation table in the security model 113 in turn comprises a method m(i) corresponding to the method call m[i]. The consequence is that the method m(i) is called in the subprogram call MyListBox.TextOut.

According to this embodiment, the VMT and DMT are generated in the security element 113 during the pre-compiling process, that is byte code generation. Thus, the method call "Call M1" is replaced by a protected message call process (M1->m[i]) converting objects to safe objects. Thus, the class information is replaced. The method call subsequently takes place by the virtual method table or dynamic method table stored in the security element 113.

Figure 6:
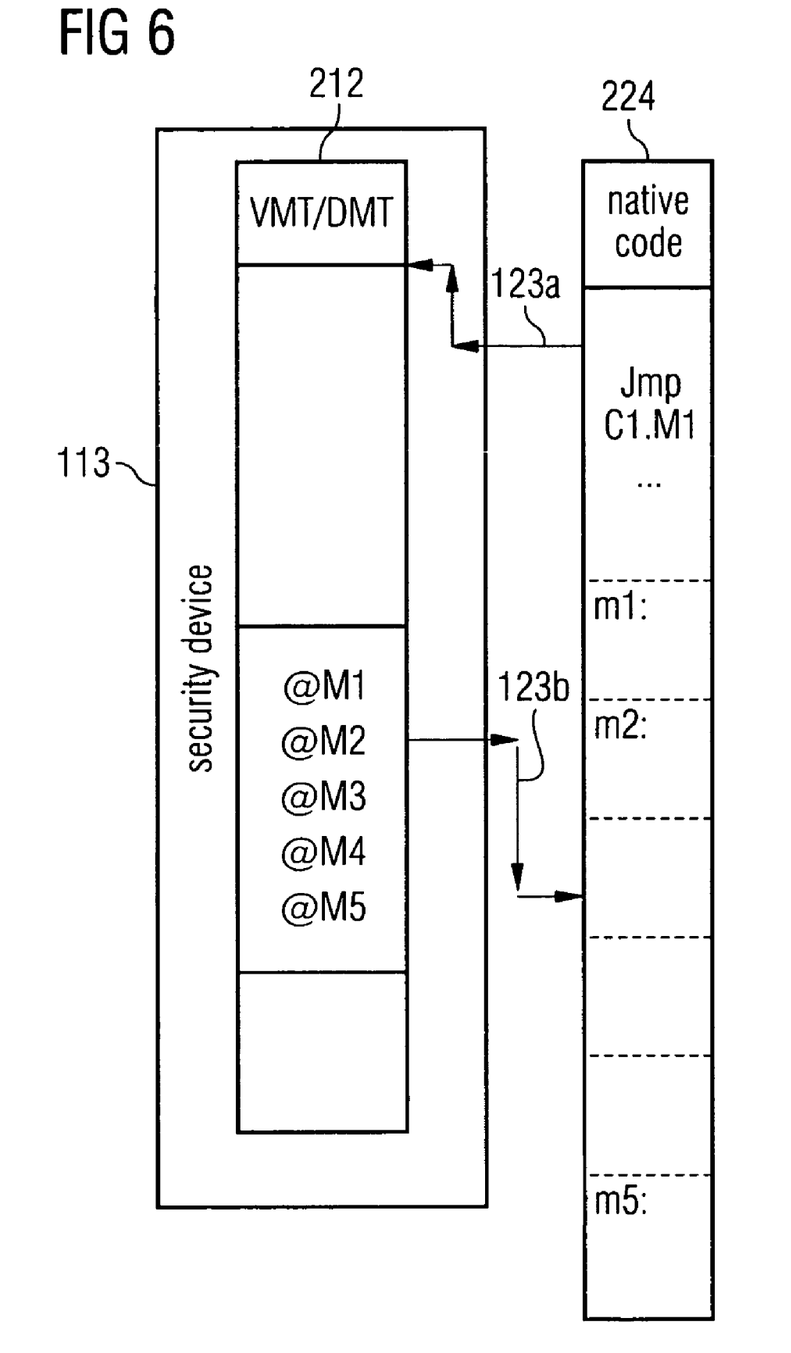
FIG. 6 shows a schematic illustration of including the security module into a virtual machine.

FIG. 6 illustrates generation of the machine code 224 during "on-the-fly" compiling where the intermediate code 104 is only translated directly when being executed. Thus, the message call is solved via the virtual method table or the dynamic method table 212 in the security element 113 during the "on-the-fly" compiling. The inventive method may thus be applied to all object-oriented languages, such as Java, C++, Pascal or .NET.

Depending on the circumstances, the inventive method for processing a program code may be implemented in either hardware or software. The implementation may be on a digital-memory medium, in particular on a disc or CD having control signals which may be read out electronically which can cooperate with a programmable computer system so that the corresponding method will be executed. In general, the invention also includes a computer program product having a program code stored on a machine-readable carrier for performing the inventive method when the computer program product runs on a computer. Put differently, the invention may also be realized as a computer program having a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for processing a program code with a plurality of subprogram calls, comprising:
a processor formed to use a program code; and
an additional hardware-based security module having an allocation table storing subprogram data, wherein access to the allocation table in the security module is restricted, and wherein the subprogram data comprise a reference to a subprogram corresponding to a subprogram call,
wherein the processor is provided with authorization information and is formed to provide, responsive to a subprogram call, a request for subprogram data, the request comprising the authorization information,
wherein the security module is formed to check the authorization information and to provide, depending on the check, the subprogram data corresponding to the subprogram call, and
wherein the processor is formed to execute, using the subprogram data, the subprogram corresponding to the subprogram call.

2. The device according to claim 1, wherein the subprogram data is arranged in the allocation table in an encrypted form, and wherein the processor for using is formed to decrypt the subprogram data using the authorization information.

3. The device according to claim 1, wherein the processor for using the program code is formed to provide the authorization information in the form of a request sequence, and
wherein the security module is also formed to evaluate the request sequence to provide, depending on the evaluation, the subprogram data corresponding to the subprogram call.

4. The device according to claim 1, wherein the program code is an intermediate code generated from a source code.

5. The device according to claim 1, wherein the processor for using the program code is a compiler formed to provide a machine code from the program code.

6. The device according to claim 1, wherein the processor for using the program code is an interpreter formed to interpret the program code and execute the program code interpreted.

7. The device according to claim 1, wherein the processor for using the program code is a virtual machine.

8. The device according to claim 1, wherein the processor for using the program code is formed to execute machine code and to provide code for forming and evaluating subprogram requests.

9. The device according to claim 1, wherein the security module is a chip card or a trusted platform module.

10. The device according to claim 1, wherein the subprogram calls are method calls of an object-oriented programming language, and wherein the allocation table is a virtual method table or a dynamic method table.

11. A method for processing a program code with a plurality of subprogram calls, comprising:
providing a processor with a program code;
providing an allocation table storing subprogram data in an additional hardware-based security module, wherein access to the allocation table in the security module is restricted, and wherein the subprogram data comprise a reference to a subprogram corresponding to a subprogram call or comprise the subprogram data itself;
providing the processor with authorization information;
using the program code in the processor and, responsive to a subprogram call, providing a subprogram data request comprising the authorization information to the security module;
by the security module, checking the authorization information and providing, depending on the check, the subprogram data corresponding to the subprogram call; and
by the processor, executing, using the subprogram data, the subprogram corresponding to the subprogram call.

12. The method according to claim 11, wherein the step of providing the allocation table includes a step of locating the allocation table in the security module.

13. The method according to claim 11, wherein the step of providing the allocation table comprises the steps of:
providing an executable program with allocation table data, access to the allocation table data in the executable program being restricted; and
executing the executable program, the executable program being formed to locate the allocation table data in the security module.

14. The method according to claim 11, wherein the steps of providing the program code and the allocation table include a step of compiling a source code to generate the program code and the allocation table.

15. The method according to claim 14, wherein the step of compiling includes a step of pre-compiling to generate the allocation table from the source code.

16. The method according to claim 14, wherein the step of compiling includes a step of pre-compiling to re-name source program subprogram calls such that an association between subprogram call name and subprogram via the subprogram call name is made more difficult without knowing the allocation table data.

17. A digital storage medium having stored thereon a computer program having a program code for performing the method according to claim 11.

* * * * *